United States Patent [19]

Klie

[11] 4,073,528
[45] Feb. 14, 1978

[54] BUMPER FOR MOTOR VEHICLES HAVING A SHOCK-ABSORBING PROFILE

[75] Inventor: Wolfgang Klie, Korntal, Germany

[73] Assignee: Daimler-Benz Aktiengesellschaft, Germany

[21] Appl. No.: 669,753

[22] Filed: Mar. 24, 1976

[30] Foreign Application Priority Data

Mar. 25, 1975 Germany .................. 2513024

[51] Int. Cl.² .................................. B60R 19/08
[52] U.S. Cl. ...................................... 293/98
[58] Field of Search .............. 293/71 R, 98, 71 P, 293/88; 152/379, 398, 399, 400

[56] References Cited

U.S. PATENT DOCUMENTS

| | | | |
|---|---|---|---|
| 2,926,904 | 3/1960 | Erlbacher | 293/71 R X |
| 3,638,985 | 2/1972 | Barton et al. | 293/71 R |
| 3,843,182 | 10/1974 | Walls et al. | 293/88 |
| 3,884,516 | 5/1975 | Gallion et al. | 293/71 R X |

Primary Examiner—Stanley H. Tollberg
Assistant Examiner—Norman L. Stack, Jr.
Attorney, Agent, or Firm—Craig & Antonelli

[57] ABSTRACT

A bumper for motor vehicles with a cross bearer at least indirectly supported at the vehicle frame and constructed essentially as closed hollow profile and with an elastically yielding impact-absorbing profile member essentially U-shaped in cross section which is detachably and form-lockingly secured at the cross bearer on the impact-endangered side thereof; the U-shaped profile is thereby clamped with its leg ends over its entire length between web-like mounting edges extending in the longitudinal direction of the cross bearer, on the one hand, and corresponding lateral web-like mounting edges of a clamping bar also extending in the longitudinal direction and secured to the cross bearer, on the other; the web-like mounting edges of the cross bearer extend at least approximately perpendicularly to the legs of the U-shaped profile member and engage in corresponding longitudinal grooves of the U-shaped profile member provided on the inside of the leg ends; the clamping bar which is constructed as bearer channel surrounding the cross bearer on the backside thereof and which is stabilized together with the same in its cross-sectional shape, presses with its lateral longitudinal edges the leg ends of the U-shaped profile externally against the cross bearer.

14 Claims, 1 Drawing Figure

BUMPER FOR MOTOR VEHICLES HAVING A SHOCK-ABSORBING PROFILE

The present invention relates to a bumper for motor vehicles with a cross bearer at least indirectly supported at the motor vehicle frame and constructed essentially as closed hollow profile and with an elastically yielding, shock-absorbing profile member essentially U-shaped in cross section and detachably and form-lockingly secured at the cross bearer on the impact-endangered side thereof, whereby the U-shaped profile member is clamped with its leg ends over its entire length between web-like mounting edges extending in the longitudinal direction of the cross bearer and arranged at circumferential places of the cross bearer that face the U-shaped profile member and are located as far in the direction toward the U-shaped profile member as possible, on the one hand, and corresponding lateral web-like mounting edges of a clamping bar also extending in the longitudinal direction and fastened against the cross bearer by clamping-type fastening means, on the other.

Such a bumper is the subject matter of an earlier application. In this prior application, longitudinal bulges at the ends of the U-shaped profile member were spread apart by a clamping bar arranged on the inside of the profile member between web-like mounting edges of the cross bearer inclined wedge-shaped toward one another, similar to the manner in which the radially inner beads of an automobile tire are pressed into the flanks of a rim bed. For this purpose, the clamping bar has to be provided with several tie-rods extending through the cross bearer in the impact direction. This creates certain problems of the stress introduction and of the force distribution from the tie-rods into the clamping bar. Furthermore, the clamping bar becomes somewhat complicated from a manufacturing point of view due to the tie-rods and the described stress introduction. As to the rest, the clamping bar is a relatively large and heavy structural part which, however,—apart from its own slight inherent rigidity—does not itself contribute significantly to the rigidity and strength of the bumper. As to the rest, the clamping bar can be deformed by the impacts which penetrate the elastic profile up to the base because it is arranged on the impact-endangered side of the cross bearer.

It is the aim of the present invention to eliminate the described disadvantages. This is achieved according to the present invention in that the web-like mounting edges of the cross bearer extend at least approximately perpendicularly to the legs of the U-shaped profile member and engage in corresponding longitudinal grooves of the U-profile provided on the inside of the leg ends, and in that the clamping bar is constructed as bearer channel having a large profile dimension in the impact direction which surrounds the cross bearer on the backside thereof and is stabilized therewith in its cross-sectional shape, whereby the bearer channel presses with its lateral longitudinal edges the leg ends of the U-shaped profile member externally against the cross bearer.

The clamping bar constructed as bearer channel, by the rearward arrangement thereof at the cross bearer, is removed from the impact access. The clamping bar receives a bearer function by the large web height of the clamping bar in the impact direction and by the stabilization effected by means of the cross bearer as regards its cross-sectional shape and can be incorporated in the dimensioning of the cross bearer. As a result thereof, the cross bearer can be constructed more lightweight and/or less high in the impact direction. The clamping bar can be constructed as simply punched-out and apertured sheet metal without special measures for the stress introduction of tie-rod forces. The form-locking engagement between the U-shaped profile member and the cross bearer also withstands strong loads and deformations of the U-shaped profile.

For the purpose of better impact absorption and load distribution onto the cross bearer in the width dimension, it is appropriate if the U-shaped profile is provided on the inside with a large number of cross ribs and if the front face of the cross bearer is constructed as support plate for the cross ribs. The cross ribs connecting the legs with each other may support themselves with their inner end edges at the support plate in case of an impact and may thus transmit the impact force into the cross bearer by way of a large surface. The deformation of the cross-ribs serves the impact absorption.

Accordingly, it is an object of the present invention to provide a bumper for motor vehicles having an impact-absorbing profile which avoids by simple means the aforementioned shortcomings and drawbacks encountered in the prior art.

Another object of the present invention resides in a bumper for motor vehicles having an impact-absorbing profile which is simple in construction and highly effective for its intended purposes.

A further object of the present invention resides in a bumper for motor vehicles with an impact-absorbing profile in which the various parts can be easily manufactured and assembled and which utilizes relatively lightweight parts.

A still further object of the present invention resides in a bumper of the type described above which exhibits high rigidity and strength and which assures an improved absorption and load distribution of the resulting forces.

These and other objects, features and advantages of the present invention will become more apparent from the following description when taken in connection with the accompanying drawing which shows, for purposes of illustration only, one embodiment in accordance with the present invention, and wherein.

Figure 1:
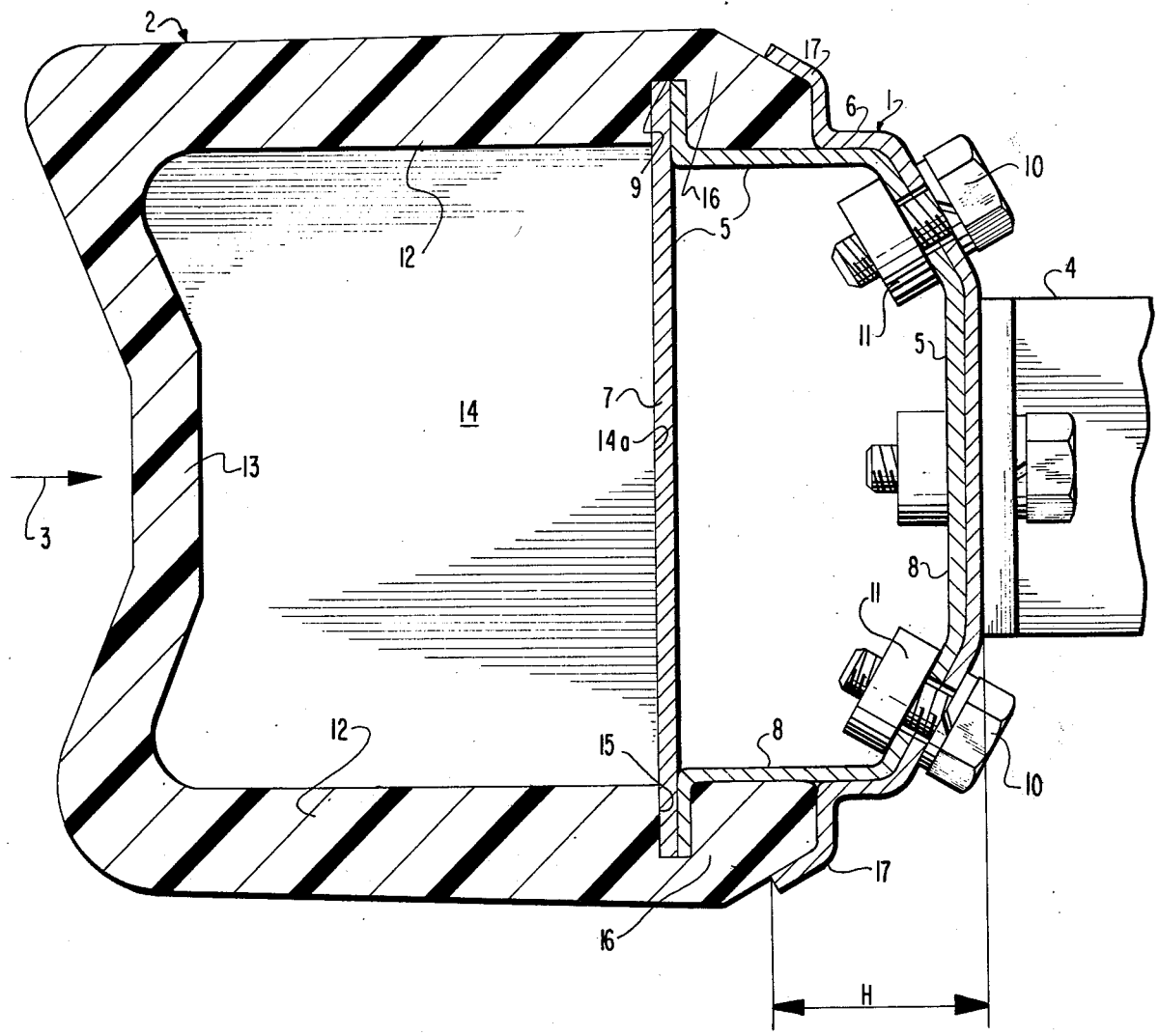
FIG. 1 is a cross-sectional view through a bumper in accordance with the present invention.
Figure 2:
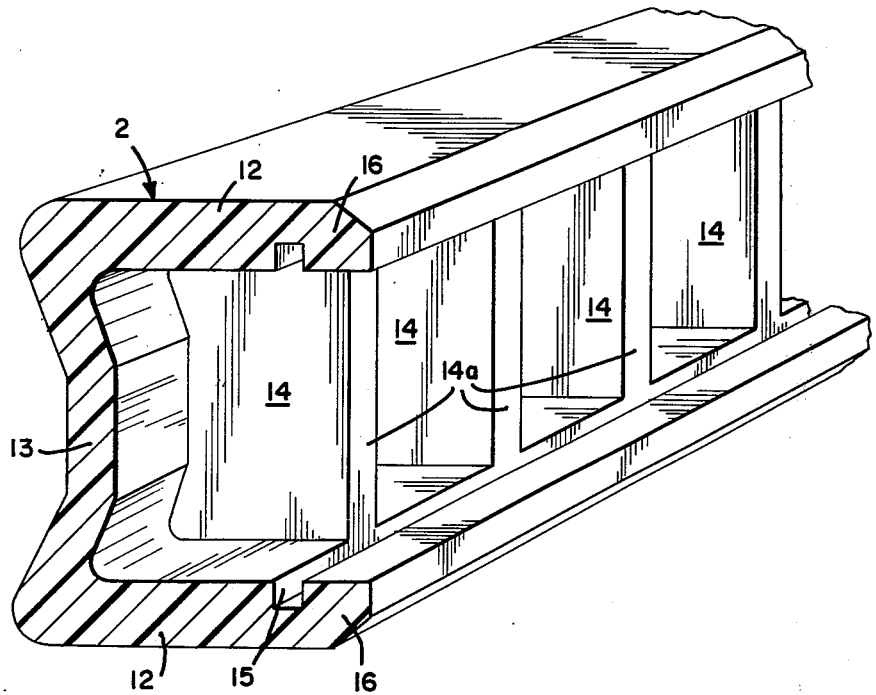
FIG. 2 is an isometric view taken from the right rear corner of the bumper of FIG. 1 with the hollow cross bearer removed.

Referring now to the figures of the drawings, the bumper in accordance with the present invention essentially consists of two parts, namely of a cross bearer generally designated by reference numeral 1 secured at the vehicle frame and of an elastic impact-absorbing profile member generally designated by reference numeral 2 of essentially U-shaped cross section which is detachably and form-lockingly secured on the impact-endangered side of the cross bearer, whereby the impact direction is indicated by arrow 3.

The cross bearer 1 which is threadably connected at the frame (not shown) of a motor vehicle by way of the bent flat bars 4, is constructed as hollow bearer. It is composed of several parts, and more particularly at first of the hollow bearer 5, properly speaking, and of the rearward clamping bar 6 for the U-shaped profile which serves as bearer reinforcement. The hollow bearer 5, properly speaking, includes in the illustrated embodiment a rectilinear support plate 7 facing the U-shaped profile member, the function of which will be described more fully hereinafter. A channel- or trough-shaped steel metal profile member 8 is welded by means of its lateral flanges to the lateral edges of the support plate 7, whence the hollow profile member 5 results. Web-like mounting edges 9 extending in the longitudinal direction of the cross bearer 5 will result at the top and at the bottom of the cross bearer 5 by reason of the welded connection of the flanges. These mounting edges 9, on the one hand, are arranged at the cross bearer 5 perpendicularly to the impact direction 3 by reason of the rectilinear construction of the support plate 7 and, on the other, are arranged in the illustrated cross section at those circumferential places of the cross section which are disposed as close to the U-shaped profile 2 as possible.

The rear portion of the hollow bearer 5, as viewed in the impact direction 3, is covered by a channel- or trough-shaped clamping bar 6 which closely surrounds the hollow bearer 5 and is threadably connected with the same by the use of welded-on nuts 11 and bolts 10, whereby the open profile which is inherently labile and unstable, is stabilized in its shape. The clamping bar 6 has a large profile dimension H in the impact direction 3 so that it exhibits a high bending strength by reason thereof and by reason of its sturdy shape. It therefore contributes considerably to the bending strength of the entire cross bearer 1. The edges of the clamping bar 6 are strongly reinforced and stiffened by crimping, corrugations or beads, from which results a high edge rigidity. However, above all, the edge portions are so selected that a good edge clamping action will result for the impact-absorbing U-shaped profile 2 to be described more fully hereinafter.

The impact-absorbing profile 2 detachably and form-lockingly secured at the cross bearer, has a thick wall of elastic material or of rubber; the wall is arranged essentially U-shaped so that legs 12 and a web 13 of the profile can be distinguished.

A large number of transversely extending cross ribs 14 connecting the legs 12 and the web 13 are arranged on the inside of the U-shaped profile 2, which at their open forward edge 14a are constructed corresponding to the shape of the support plate 7 and abut against the same and are able to support themselves against the same in case of impact.

Grooves 15 are provided at the ends of the legs 12 on the inside thereof which extend transversely to the direction of the legs and correspond to the location and shape of the mounting edges 9. In the illustrated embodiment, one groove flank is flush with the front edge 14a of the cross ribs 14 so that a large-surfaced and uniform support can take place on the support plate 7 and on the mounting edge 9. The portion of the leg 12 of the U-shaped profile 2 which extends to the rear of the groove 15, forms a fastening bead or bulge 16. The side edges 17 of the clamping bar 6 overlap these beads or bulges 16 with prestress and the beads 16 are pressed externally onto the cross bearer 1. In another possible embodiment, the side edges 17 may thereby also engage into a longitudinal groove disposed transversely to the groove 15 and provided in the bead 16. In every case, however, a lifting-out of the leg ends 12 out of the mounting edges 9 under impact loads is reliably prevented by the clamping bar 6 or the lateral edges 17 thereof. An excessive spreading of the U-shaped profile 2 in the vertical direction and therewith a danger of a lifting-out thereof out of the mounting edge 9 is also precluded by the cross ribs 14. The impact load is absorbed by the mounting edge 9—compression of the legs 12—and by the support plate 7—compression of the cross ribs 14—and is further transmitted onto the cross bearer 1 over a large area.

While I have shown and described only one embodiment in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

I claim:

1. A vehicle bumper comprising: a hollow cross bearer, an impact absorbing hollow profile means, clamping bar means for mounting said hollow cross bearer at the vehicle, mounting means for mounting said impact absorbing hollow profile means at the hollow cross bearer on an impact-endangered side thereof, said mounting means including mounting edges provided on said hollow cross bearer extending transversely to a normal impact direction on said impact absorbing hollow profile means, further edges defined by free edges of the clamping bar means being spaced from said mounting edges, at least a first portion of said further edges extending parallel to said mounting edges, groove means extending in a longitudinal direction of the vehicle bumper provided in said impact absorbing hollow profile means for engaging said mounting edges, said mounting edges, said further edges, and said groove means being arranged with respect to each other so that a portion of said impact absorbing hollow profile means is accommodated in the space between the mounting edges and said further edges, whereby a detachment of said impact absorbing hollow profile means upon an impact loading is avoided, said hollow cross bearer including a U-shaped profile member opening in a direction facing said impact absorbing hollow profile means, said U-shaped profile member including lateral flanges at each leg end thereof, and a support plate extending transversely of the impact direction secured to said lateral flanges of said profile member, wherein said lateral flanges and at least a portion of said support plate define said mounting edges.

2. A bumper according to claim 1, wherein said clamping bar includes a channel-shaped member having an open profile corresponding to a portion of the U-shaped profile member so as to permit said channel-shaped member to closely surround at least a portion of the U-shaped profile member and stabilize the same.

3. A bumper according to claim 2, wherein said further edges include a second portion overlapping at least a portion of said impact absorbing hollow profile member to maintain the position of said profile member in the space between the mounting edges and said further edges upon an impact loading of the vehicle bumper.

4. A vehicle bumper comprising:
 (a) a hollow cross bearer;
 (b) an impact absorbing hollow profile means;
 (c) clamping means for mounting said hollow cross bearer at the vehicle;
 (d) mounting means for mounting said impact absorbing hollow profile means at the hollow cross bearer on an impact-endangered side thereof, said mounting means including mounting edges provided on said hollow cross bearer extending transversely to a normal impact direction on said impact absorbing hollow profile means; and (e) groove means extending in a longitudinal direction of the vehicle bumper provided in said impact absorbing hollow profile means for engaging said mounting edges;

wherein said hollow cross bearer includes a U-shaped profile member opening in a direction facing said impact absorbing hollow profile means, said U-shaped profile member including lateral flanges at each leg end thereof, and a support plate extending transversely of the impact direction secured to said lateral flanges of said profile member, and wherein said lateral flanges and at least a portion of said support plate define said mounting edges.

5. A bumper according to claim 4, wherein said clamping means includes a channel-shaped member having an open profile corresponding to a profile of a portion of the hollow cross bearer so as to permit said channel-shaped member to closely surround at least a portion of the hollow cross bearer and stabilize the same.

6. A bumper according to claim 6, wherein said mounting means includes further edges defined by free edges of the channel-shaped member being spaced from said mounting edges, at least a first portion of said further edges extending parallel to said mounting edges, and wherein said further edges include a second portion overlapping at least a portion of said impact absorbing hollow profile member to maintain the position of said profile member in the space between the mounting edges and said further edges upon an impact loading of the vehicle bumper.

7. A bumper according to claim 4, wherein said clamping means is constructed as a bearer channel means surrounding said hollow cross bearer on the back side thereof and stabilized together with the same in its cross-sectional shape, said bearer channel means having a relatively large profile dimension in the impact direction.

8. A bumper according to claim 6, characterized in that the mounting edges are arranged at circumferential places of the cross bearer circumference that are located relatively far in the direction toward the U-shaped profile member.

9. A bumper according to claim 8, characterized in that the clamping means is detachably clamped to the cross bearer means.

10. A bumper according to claim 9, characterized in that the clamping means includes a clamping bar which has a relatively large profile dimension in the impact direction.

11. A bumper according to claim 10, characterized in that the U-shaped profile member is provided on the inside thereof with a large number of cross ribs and in that the front face of the cross bearer is constructed as support plate for the cross ribs.

12. A bumper according to claim 6, characterized in that the clamping means includes a clamping bar which has a relatively large profile dimension in the impact direction.

13. A bumper according to claim 6, characterized in that the U-shaped profile member is provided on the inside thereof with a large number of cross ribs and in that the front face of the cross bearer is constructed as support plate for the cross ribs.

14. A bumper according to claim 13, characterized in that the clamping means includes a clamping bar which has a relatively large profile dimension in the impact direction.

* * * * *